April 2, 1935. J. G. W. MULDER 1,996,482

MULTIPHASE ALTERNATING CURRENT RECTIFIER

Filed Dec. 1, 1928

Inventor:
J. G. W. Mulder,
By Langner, Parry, Card Langner
Attys.

UNITED STATES PATENT OFFICE 1,996,482

MULTIPHASE ALTERNATING-CURRENT RECTIFIER

Johannes Gijsbertus Wilhelm Mulder, Eindhoven, Netherlands, assignor to N. V. Philips' Gloeilampenfabrieken, Eindhoven, Netherlands, a limited liability company of the Netherlands Application December 1, 1928, Serial No. 323,174
In the Netherlands January 14, 1928

8 Claims. (Cl. 175—363)

The invention relates to rectifying devices having a gas-filled rectifying tube comprising an incandescent cathode and especially to polyphase rectifying devices.

In a rectifying installation, the current derived from a source of alternating current of one of the ordinary commercial voltages is usually supplied to a rectifying tube via a transformer in order to produce a rectified current which also is of one of the ordinary commercial voltages. The ratio of transformation of the transformer is so chosen that the average terminal voltage at which the rectified alternating current is supplied to a consuming device has a definite value. The price of the transformer constitutes a considerable percentage of the initial cost of such an installation and besides, a large portion of the room occupied by the installation is taken up by the transformer. In addition, the energy-losses of the transformer contribute to decrease the efficiency of the installation. Furthermore, it is customary to connect steadying resistances in series with the anodes of polyphase rectifying tubes. Due to the Joule loss occurring in these resistances, the efficiency of the installation is further decreased.

The invention has for its object to convert, with slight losses of energy, current from a polyphase alternating current network, into direct current of a commercial voltage which is substantially constant at different loads without the use of the above-mentioned transformer and preferably without steadying resistances. More particularly, it is the object of the invention to so convert an alternating-current input of substantially constant voltage into a direct-current output that the value of the direct-current voltage corresponds to a commercial voltage, at which consuming devices having a standard rating can be used, and which direct-current voltage remains substantially constant with a load varying from practically no-load to full-load. A further object of the invention is to obtain the above results without the use of an intermediate transformer, and by the use of gas-filled rectifying tubes, which tubes, instead of being designed for maximum efficiency, are designed for the purpose of taking up the full difference between the input and the output voltage and the internal voltage drops of which are substantially constant from no-load to full-load of the rectifier tube.

Thus, by changing the available alternating-current input, for instance a 3-phase network of a given commercial voltage, into a direct-current output of similar voltage, direct-current consuming devices can be used from an alternating-current network with a slight loss of energy and at a voltage which is independent of the load. A rectifying device according to the invention comprises a gas-filled rectifying tube provided with an incandescent cathode, preferably an oxide cathode, and a heating-current transformer. Such a device is adapted to be connected to polyphase alternating current mains and is characterized in that, without the interposition of a transformer, the anodes of the rectifying tube are electrically connected to the points of connection for the phase-wires of the network.

In one particular case a rectifying device according to the invention is characterized in that it comprises a rectifying tube functioning on such an operating voltage, and (or) impedances of such magnitude, that when the device is connected to the polyphase alternating current network, the average value of the voltage available on the direct-current side is, at least at normal loads, substantially equal to the effective value of the phase-voltage of the network or to the next value which is a commercial voltage for direct current.

The connections between the anodes of the rectifying tube and the points of connection, as well as the wires which connect the device to the direct-current connection-points, should preferably have substantially no impedance.

A polyphase rectifying tube according to the invention comprises an incandescent cathode (preferably an oxide cathode) and a gaseous filling. The tube is characterized in that when connected to a polyphase alternating-current network, it functions at such an operating voltage that, at least at normal loads, the average value of the output voltage is substantially equal to the effective value of the phase-voltage of the network or to the next value which is commercial for direct current. By "substantially equal" is meant that the average value of the available voltage may show slight variations which are not larger than those considered permissible in practice for normal cases. In one particular mode of realization, a rectifying tube according to the invention when connected to a three-phase network of 220 volts phase-voltage is operated at such an operating voltage that, at least at normal loads, the average value of the available voltage is substantially equal to 220 volts.

A suitable average value of the operating voltage of the rectifying tube may be about 38 volts.

The general principles underlying the designing of tubes which are suitable for carrying out the invention, can be found, for instance, in the textbook "Elektrische Gleichrichter und Ventile" (Electrical Rectifiers and Valves), by Professor Gunther-Schulze, published in 1924, from which it appears that the voltage drop of the tube can be increased and its efficiency decreased by increasing the length of the tube (page 14), by decreasing the diameter of the tube (page 19), by decreasing the vapor pressure (page 23), by making the anode convex (p. 24), by the admixture of gases to mercury vapor (pp. 24-25), and by increasing the gas pressure.

The invention will be more clearly understood by referring to the accompanying drawing in which Fig. 1 is a schematic diagram showing a rectifying device according to the invention.

Figure 1:
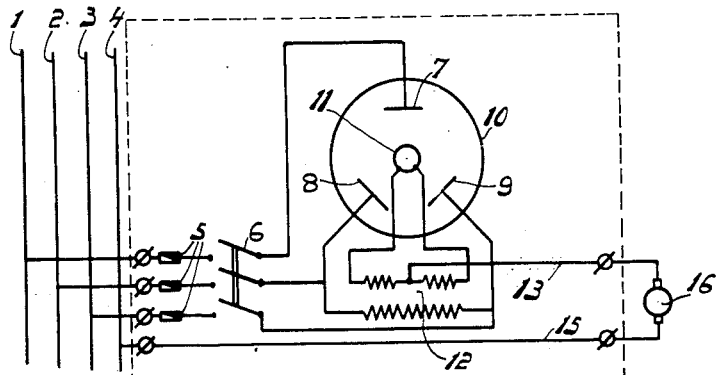

Referring to Fig. 1 the three phase-wires of a three-phase system are denoted by 1, 2 and 3. The effective interlinked-voltage between those wires may be, for example, 380 volts. 4 is the neutral wire of the system so that between this wire and each of the phase-wires there is an effective phase-voltage of 220 volts. The current is led from the phase wires 1, 2, and 3, via fuses 5 and a triple pole switch 6, to anodes 7, 8 and 9 respectively, of a discharge tube 10. 11 is an incandescent cathode to which the heating current is supplied by a small auxiliary transformer 12 whose primary winding is connected between the phase-wires 2 and 3 and whose secondary is connected across the incandescent cathode 11 and is tapped in the middle by a conductor 13. The latter may be connected to the positive pole of a consuming device 16, for example a direct current motor, while a conductor 15 connects the neutral wire 4 to the negative pole. The current flows alternately from one of the phase wires 1, 2 and 3 via one of the anodes 7, 8 and 9 to the cathode 11, is distributed to the two halves of the secondary winding of the auxiliary transformer 12, flows from the middle branch to the consuming device 16 and then back to the network. The rectifying tube, a suitable type of which is hereinafter described with reference to Figure 2, has, if the leads leading to the direct-current connecting points have no impedance, such an operating voltage that, at least at normal loads, the average value of the output voltage is substantially equal to the effective value of the phase-voltage of the network or to a value which is commercial for direct current.

Figure 2:
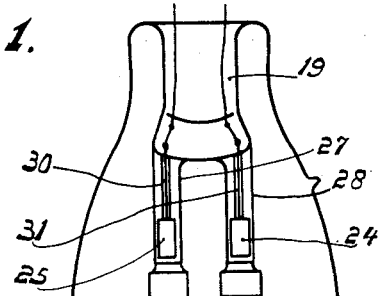
Fig. 2 is a side view of a rectifying tube suitable for carrying out the invention.

Referring to Figure 2, the numeral 17 denotes a glass envelope which is closed at both ends by stems 18 and 19. An incandescent cathode 20 is supported by pole wires 22 sealed in a pinch 21. Anodes 23, 24 and 25 consisting, for example of cylindrical pieces of carbon, are arranged inside small glass tubes 26, 28 and 27 respectively, these tubes having a narrowed portion near the outer end of the anodes. This construction serves to prevent a discharge between the anodes and to increase the back ignition voltage of the tube. It is not necessary, therefore, to connect steadying resistances in series with the anodes. The lead wires of the anodes are protected against disintegration by small tubes 29, 30 and 31 of insulating material, for example of hard glass. The rectifying tube may be filled with argon under a pressure of about 0.73 mm. of mercury.

The incandescent cathode preferably consists of a core-wire of refractory metal, for example, tungsten, which is wound into the shape of a wide helix and on which a second wire, for example of nickel, is also helically wound; the electron-active material, for example barium oxide, being applied to the second wire. Other incandescent cathodes, for example tungsten-thorium or molybdenum-thorium-incandescent cathodes, may also be used but oxide cathodes are to be preferred, inter alia because they yield a higher efficiency. By spacing the turns of the cathode far apart, not only that portion of the cathode-surface which is turned to the exterior emits electrons but the entire circumferential surface of the wire participates in the emission.

Figure 3:
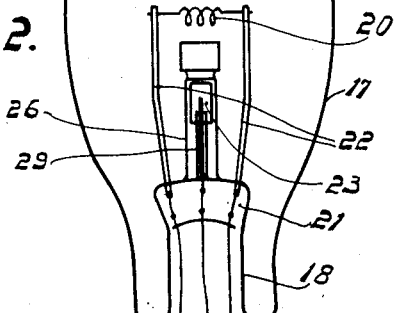
Fig. 3 is a diagram to explain the operation of the device.

Referring to Fig. 3, apart from slight modifications due to incidental circumstances, the voltage E which the cathode may have with respect to the neutral wire of the three-phase network to which the tube is connected, is graphically represented by a curve 32. The curves 33, 34 and 35 of this figure represent the voltage existing between the anodes and the neutral wire. During the operation of a rectifying tube according to Figure 2, an arc discharge is produced between the electrodes. At any instant the arc voltage $e_b$ is equal to the difference between the voltages which the functioning anode and the cathode have with relation to the neutral wire. When the voltage of the system varies sinusoidally with time, the average value $e_g$ of the voltage between an anode and the neutral wire taken during the time in which the anode supplies current (which is, for the case represented in Figure 3, a lapse of time from about ⅙ period before until about ⅙ period after the moment at which this voltage reaches its maximum value $e_m$) is about $$\frac{3e_m\sqrt{3}}{2\pi}.$$

When the effective value of the phase-voltage is called $e_{eff}$, we may write $$e_g = \frac{3e_{eff}\sqrt{6}}{2\pi} \quad (1)$$

If the average value of the voltage between the cathode and the neutral wire is called $E_g$, the average arc voltage $e_{bg}$ is:

$$e_{bg} = \frac{3e_{eff}\sqrt{6}}{2\pi} - E_g \quad (2)$$

which value can be determined, for example oscillographically. When use is made of a three-phase system having an effective phase-voltage of 220 volts, and thus 380 volts between two phases (interlinked voltage) and when it is desired to obtain an $E_g$ of 220 volts, it follows from Formula (2) that $e_{bg}$ must be $$\frac{3 \times 220\sqrt{6}}{2\pi} - 220 = \text{about 38 volts.}$$

When a three-phase system having an effective interlinked voltage of 220 volts (and thus an effective phase-voltage of 127 volts) is available and when the rectifying tube has to furnish an average output voltage of 110 volts, it is found that, (in accordance with the above Equation 2), $$e_{bg} = \frac{3 \times 127\sqrt{6} - 110}{2\pi} = \text{also about 38 volts.}$$

Since, as appeared, the average arc voltage $e_{bg}$ does substantially not depend on the current, the available voltage does not vary substantially with the load. Under suitable conditions it may be measured, for example, at a current intensity varying between 3 ma. and more than 20 amp. the voltage does not change substantially. Owing to the fact that energy-transformers and steadying resistances can be dispensed with, it is possible to obtain a very high efficiency, for example, an efficiency of 95%, with a rectifying installation comprising a rectifying tube according to the invention.

What I claim is:

1. A rectifying device adapted for connection to a 3-phase alternating current network and in which the voltage of the 3-phase input is materially higher than the voltage of the direct current output, comprising at least one gas-filled rectifying tube having an efficiency lower than that of the ordinary gas-filled rectifying tube and having an incandescible cathode and a plurality of anodes, a 3-phase alternating current network, said anodes being directly connected to said network without the interposition of a transformer, the output voltage on the direct current side of the tube for any load within the normal load capacity of the tube being substantially equal to that direct current voltage used in practice which most closely approximates the phase voltage of the network, the design of the tube and its efficiency being such that the voltage drop in said tube corresponds to the difference between the voltage of the three-phase input and the desired voltage of the direct current output regardless of variations in the load on the output.

2. The method of rectifying alternating current at the usual phase voltage, and in which the voltage of the input is materially higher than the voltage of the direct current output, comprising directly connecting both said input and said output with a rectifier tube, of efficiency lower than that of the ordinary rectifying tube, and producing a substantially constant voltage drop in said tube corresponding to the difference between the voltage of the input and the desired voltage of the direct current output, the rectifier supplying to the load of the output, a substantially fixed direct current voltage irrespective of the variations of said load, the voltage loss between the input and output occurring in the tube.

3. A rectifying device adapted for connection to a substantially constant-voltage 3-phase alternating current network and in which the voltage of the 3-phase input is materially higher than the voltage of the direct current output, comprising at least one gas-filled rectifying tube of low efficiency and having an incandescible cathode and a plurality of anodes, a 3-phase alternating current network, said anodes being directly connected to said network without the interposition of a transformer, a direct current output circuit across said rectifying tube, and a variable load device in the output circuit, said rectifier supplying to said load a substantially fixed direct current voltage irrespective of the variations of said load, the voltage loss between the input and output circuits occurring in said tube.

4. A rectifying device adapted for connection to an alternating current supply source of at least one phase, comprising at least one gas-filled rectifying tube having an incandescible cathode and anodes, a substantially constant-voltage alternating current supply source having a phase-voltage of 220 volts, said anodes being directly connected to said supply source, said tube being designed to operate within its normal load capacity with a voltage drop of about 38 volts to produce an output voltage of 220 volts at the direct current side of the tube, a direct current line connected directly across said tube, and a variable load in said direct current line, said rectifying device supplying to said load a substantially fixed direct current voltage irrespective of the variations of said load, the voltage loss between the supply source voltage and a load voltage occurring in said tube.

5. A rectifying device adapted for connection to a three-phase alternating current network, consisting substantially entirely of at least one gas-filled rectifying tube having an incandescible cathode and anodes, a substantially constant voltage three-phase alternating current network of 220 volts interlinked voltage, said anodes being directly connected to said network, said tube being designed to operate within its normal load capacity with a voltage drop of about 38 volts to produce an output voltage of 110 volts at the direct current side of the tube, a direct current line connected directly across said tube, and a variable load in said direct current line, said rectifying device supplying to said load a substantially fixed direct current voltage irrespective of the variations of said load, the voltage loss between the alternating-current network voltage and the load voltage occurring in said tube.

6. A system for rectifying a substantially constant alternating-current supply serving as an input voltage and for absorbing the voltage difference between said input voltage and a commercial direct current output voltage, comprising a low-efficiency gas-filled rectifier tube having a cathode and anodes and connected directly across both said input and output, the efficiency of the tube being lower than that of the ordinary gas-filled rectifying tube and being so designed that its characteristic internal voltage drop will just compensate for the difference between the phase voltage of the alternating current supply and the voltage of the output of commercial voltage irrespective of variations in the load on the output.

7. A system for rectifying a substantially constant alternating-current voltage, and for absorbing the voltage difference between said alternating-current voltage and a commercial direct-current voltage, and comprising a gas-filled rectifying tube having a cathode and an anode and connected on the input side directly to said alternating-current voltage and on the output side directly to said direct-current voltage, the voltage drop across said tube being substantially constant regardless of fluctuations in the load, said tube being designed to have an internal voltage drop which will just compensate for the difference between the phase voltage of the alternating-current supply and the commercial voltage of the direct-current output, irrespective of variations in the output-load, said tube having a lower efficiency than that of the ordinary gas-filled rectifying tube.

8. A rectifying device adapted for connection to a 3-phase alternating-current network and in which the voltage of the 3-phase input is materially higher than the voltage of the direct-current output, comprising at least one gas-filled rectifying tube having an incandescible cathode and a plurality of anodes, a 3-phase alternating network, said anodes being directly connected to said network without the interposition of a transformer, said tube being designed to have an internal voltage drop corresponding to the difference between the voltage of the 3-phase input and the desired voltage of the direct-current output regardless of variations in the load of the output and having an efficiency lower than that of the ordinary gas-filled rectifying tube.

JOHANNES GIJSBERTUS
WILHELM MULDER.